Feb. 22, 1927. Re. 16,559

B. W. KADEL

DRAFT RIGGING

Original Filed Sept. 4, 1923

Inventor:
Byers W. Kadel
by Arnold S. Mechlin
his Attorney.

Reissued Feb. 22, 1927. Re. 16,559

UNITED STATES PATENT OFFICE.

BYERS W. KADEL, OF BALTIMORE, MARYLAND, ASSIGNOR, BY MESNE ASSIGNMENTS, TO THE SYMINGTON COMPANY, A CORPORATION OF MARYLAND.

DRAFT RIGGING.

Original No. 1,603,606, dated October 19, 1926, Serial No. 660,905, filed September 4, 1923. Application for reissue filed November 12, 1926. Serial No. 148,308.

This invention relates to draft rigging for railway cars and, particularly stated, involves the production of a comparatively simple single key draft gear construction.

An object of the present invention is to provide a strong and reliable draft rigging in which a plurality of flanged members are employed and disposed at the respective ends of the draft rigging pocket for receiving the draft and buffing strains, said members being arranged so as to bridge and tie the draft sills to which latter they are connected at a plurality of points by advantageously disposed rivets.

Another object of the invention resides in the provision of a draft rigging embodying a key adapted to slidably connect the coupler and yoke, and cooperating flanged stop members or castings, two of said castings providing relatively strong but light weight front stop members arranged above and below the yoke and coupler and designed to receive the draft strains, the other of said castings being arranged at the rear of said yoke and adapted to receive the buffing strains, both the draft and buffing strains being imparted through a cushioning mechanism preferably of the friction spring type suitably contained within the draft rigging.

A further object of the invention is to provide a railway draft rigging of durable construction in which the flanged members forming the front stop members and providing vertically alined stop faces, are formed with attaching flanges which are longitudinally offset but of substantially the same relative strength value whereby a similar number of connecting rivets can be advantageously employed without interfering with the other associated elements of the draft rigging, such as the striking casting, for example.

A still further object of the present invention is to provide a railway draft rigging in which the lower front stop member, in addition to presenting a transversely disposed T-shaped reinforced wall adapted to receive the draft strains the full width of the draft rigging pocket, is also provided with a horizontal flange which acts to reinforce said wall and also provides a support for the inner end of the coupler stem.

The invention further consists in the combination and arrangement of the several parts which will be hereinafter described.

In the drawings illustrating an embodiment of my invention, the scope whereof is set forth in the claims:—

Figure 1:
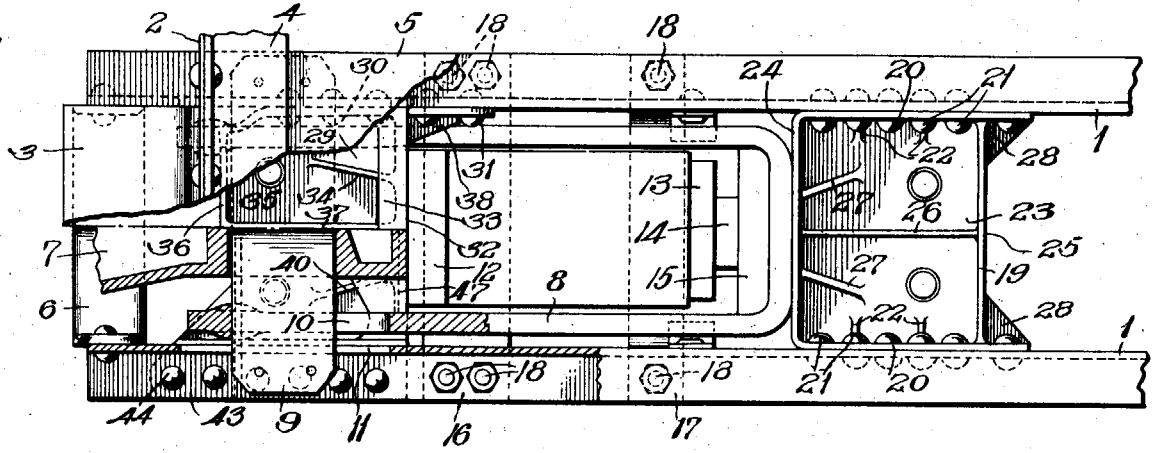
Figure 1 is a top plan view of a railway draft rigging embodying my invention, a portion of said figure being shown in horizontal section.

Referring to the drawings in which corresponding reference characters designate similar parts in the several views, 1—1 designate the car center or draft sills, 2 the end framing, 3 the striking casting to which the end framing is connected by means of the angle member 4, and 5 the cover plate. A coupler carrying iron 6 is shown attached to the draft sills.

The coupler 7 is connected to the yoke member 8 by means of a transversely extending key 9, said key passing through suitable slots 10 provided in the yoke arms and registering slots 11 formed in the draft sills. Interposed between the rear end of the coupler and the closed or looped end of the yoke is the cushioning mechanism or draft gear proper, which may comprise a friction barrel having a follower portion 12, shown as cooperating with the front stop member and a series of wedging blocks 13 and a wedge block 14, the latter being adapted to contact a suitable filler block 15 connected to the inner face of the rear end of the yoke. It is to be understood that the particular form of cushioning mechanism illustrated, while advantageously included with my present design of draft rigging, is capable of change and modification, and I do not wish to be understood as limiting the invention to the exact type disclosed.

The cushioning mechanism is maintained in position between the yoke arms and in alinement with the coupler and the backstop member of the draft rigging by means of a pair of straps or draft gear supporting members 16 and 17, said mechanism being connected to the lower flanges of the draft sills by means of bolts 18.

The draft gear is adapted to be received into a draft rigging pocket formed between the draft sills and a plurality of flanged members arranged to bridge and tie the draft sills at the front and rear ends of the pocket, respectively. The front members are disposed above and below the yoke and coupler and provide transversely extending stop lugs capable of receiving the draft strains and transmitting them to the draft sills or center sills of the car underframing. The rear member or backstop is arranged at the rear end of the yoke and in longitudinal alinement with the coupler stem, a transverse wall being provided with which the yoke contacts in transmitting buffing loads to the draft sills or center sills. Each flanged member is preferably a casting capable of being economically manufactured and provided with advantageously located reinforcing webs or ribs, all as will hereinafter appear in connection with the description of each member now to be given.

The rear member or backstop 19 is provided with side walls 20 each of which is formed with a plurality of openings adapted to receive rivets 21 which firmly connect the member to the draft sills. The side walls are provided with portions projecting above and below the planes of the remaining portions, and connected to these projecting portions are the reinforcing ribs 22 which unite the side walls to the horizontally disposed web 23 of the backstop. The side walls are united by the horizontally disposed web 23, and also by the front end wall 24 and a rear wall 25, said horizontal web 23 also serving to unite the respective end walls longitudinally of the casting. The respective end walls are also reinforced and united by a vertically disposed web 26 which intersects the horizontal web 23 and has portions thereof extending above and below the same, as shown. Reinforcing webs 27 are provided for the front or buffing wall 24, said webs being angularly disposed with relation to the vertical web 26 and designed to terminate short of the side walls and rear end wall. Ribs 28 may also be provided to unite the ends of the side walls with the rear end wall. The backstop rigidly connects the spaced draft sills, and while of comparatively simple construction, it presents an adequately reinforced buffing wall capable of effectively receiving the buffing loads incident to service conditions. The upper front stop member 29 bridges the draft sills and is located above the yoke and coupler stem, said member being provided with side walls 30 formed with suitable openings adapted to receive rivets 31 for firmly connecting the web to said draft sills at a plurality of points forwardly of the front stop face and at a plurality of points in the rear of said stop face. A vertical web or wall 32 extends transversely of the draft rigging pocket and unites the side walls 30, said web providing a front stop face cooperatively associated with the forward end of the cushioning mechanism. The vertical web 32 is provided with a transversely arranged and forwardly extending reinforcing flange 33. There are also provided vertically disposed and angularly arranged reinforcing ribs 34 extending from the front stop wall 32, said ribs uniting the horizontal web 35 of the front stop member with said wall. A vertically and transversely disposed flange 36 is formed on the forward end of the horizontal web 35, said flange and stop wall being further united to each other and to the horizontal web by means of a centrally located and vertically disposed longitudinal web 37. The portion of the side walls which extends rearwardly of the stop wall 32 is preferably united with said wall by webs 38. A maximum riveting area is obtained for rigidly connecting the stop members to the spaced draft sills as the result of this construction, said area being equal to the riveting area of the lower front stop member now to be described. The front rivets 31 also preferably extend through the vertical longitudinal flanges or webs of the striking casting 3.

The lower front stop member has a T-end providing a stop face formed by the transversely arranged vertically extending wall 39, said stop face being disposed in vertical alinement with the stop face formed on the wall of the upper front stop member. The wall 39 is reinforced by a plurality of vertically disposed ribs 40, some of said ribs being arranged at an angle to the centrally located vertical reinforcing rib 41. A horizontally arranged web 42 also reinforces the front stop wall 39, said web comprising the main body portion of the casting and being provided with laterally extending portions 43 adapted to underlie the lower flanges of the draft sills to which they are connected by a series of rivets 44. In the construction of the lower front stop member all of the attaching rivets are located forwardly of the front stop wall 39, this being made possible by the relatively great distance provided between the coupler carrying iron and cushioning mechanism. It will also be observed that the rivets are disposed vertically, and in passing through the lower horizontal flange of the draft channels provide a very rigid construction equal in strength to the upper front stop member and its attaching means.

The main horizontal web 42 is preferably provided at its forward end with a vertical transversely disposed flange 45, said flange projecting above and below the web, as shown. The outermost longitudinally arranged reinforming ribs 40 are continued beyond the vertical flange 45 to substantially the ends of the lateral extension 43. Angular shaped flanges 46 may be provided for uniting the vertical flanges 45 with the lateral extension 43.

Figure 2:
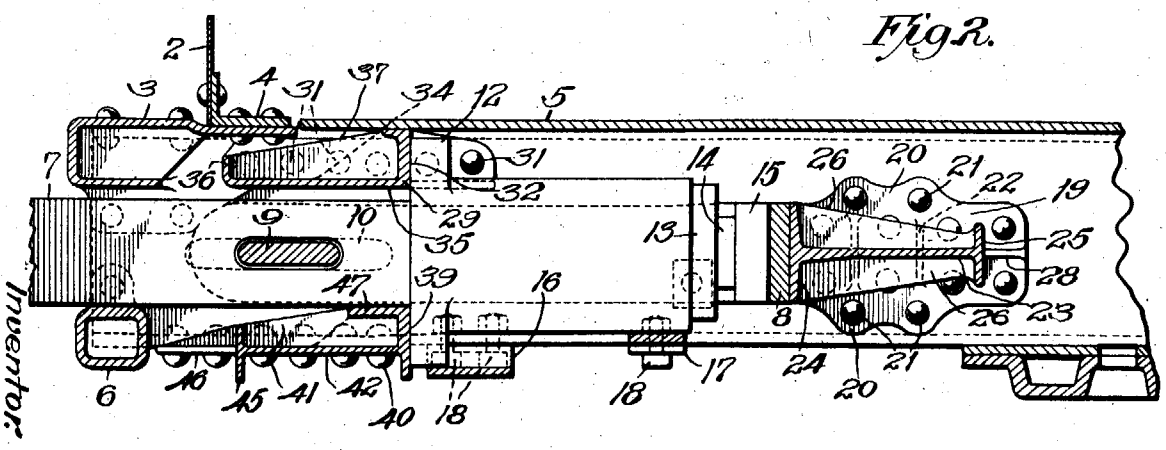
Figure 2 is a vertical longitudinal sectional view.

Arranged adjacent the upper edge of the front wall 39 is a forwardly extending web or flange 47, said flange extending transversely of the stop member and acting to support the rear end of the coupler and also the forward end of the yoke, which latter projects between the superposed front stop members. The upright ribs 40 are adapted to intersect the forward edge of the web 47 and extend beneath the same for reinforcing it. The upper surface of the supporting flange or web 47 is disposed substantially in the same horizontal plane as the upper face of the carry iron, as best shown in Figure 2. The front wall 39 may be continued beneath the horizontal web 42 to receive the full contact of the adjacent portion of the cushioning mechanism.

A draft rigging constructed in accordance with my present invention provides a very strong structure which can be contained within a relatively limited space, the respective stop members, in addition to functioning with the cooperating part of the cushioning mechanism, also acting to greatly strengthen the construction by reason of the bridging and tying the sills.

Having now described my invention, although it is to be understood that the terms employed are to be taken in their descriptive and not in their limiting sense, what I claim and desire to secure by Letters Patent, is:—

1. In a railway draft rigging, the combination with spaced center sills, of a coupler, a yoke, a key slidably connected to said coupler and yoke, cushioning mechanism, rear stop means and a plurality of front stop members bridging the draft sills and provided with stop faces disposed in vertical alinement for contacting the forward end of the cushioning mechanism, at least one of said front stop members having means positioned at an elevation approximating that of the central portion of its stop face for connecting the same to the draft sills at points forwardly and rearwardly of said stop face.

2. In a railway draft rigging, the combination with spaced draft sills, of a coupler, a yoke, a key slidably connecting said coupler and yoke, a cushioning mechanism, rear stop means connected to said spaced center sills, a plurality of front stop members bridging said draft sills, one of said front stop members being arranged above the coupler and yoke and the other of said members being disposed beneath the coupler and yoke, means connecting the lowermost stop member to the bottom of said draft sills, said means including a series of rivets extending from a point adjacent the front of the draft sills to the stop face of said lowermost member, and means including a plurality of rivets connecting said upper front stop member to the inner faces of the draft sills, some of said rivets being located between the front of the draft sills and the stop face of said member and other of said rivets being located to the rear of said stop face.

3. In a railway draft rigging, the combination with car sills, of a coupler, a yoke, means slidably connecting said coupler and yoke, a cushioning mechanism, back stop means, an upper front stop member bridging the sills and provided with a stop face adapted to coact with the forward portion of the cushioning mechanism, means connecting the upper stop member to the inner faces of the sills in front of the stop face and also at points in the rear thereof, a lower front stop member bridging said sills and having a stop face in vertical alinement with the stop face on said upper member, means connecting said lower stop member to said sills at points in front of the stop face on said lower member, the said last named means equaling in strength value the first named means connecting the upper front stop member to the sills.

4. In a railway draft rigging, the combination with car sills, of a coupler, a yoke, means slidably connecting said coupler and yoke, a cushioning mechanism, rear stop means, and relatively long flanged front stop members having vertically alined stop faces contacting the forward end of the cushioning mechanism, the uppermost of said front stop members bridging the sills and having portions riveted thereto, in front and back of the stop face on said member, and the lowermost of said front stop members bridging said sills and being connected thereto forwardly of its stop face.

5. In a railway draft rigging, the combination with car sills, of a coupler, a yoke, means slidably connecting said coupler and yoke, a cushioning mechanism, rear stop means, and flanged front stop members having vertically alined stop faces contacting the forward end of the cushioning mechanism, the uppermost of said front stop members having portions connected to the inner faces of the sills, and the lowermost of said members having a plurality of webs one of which acts to support the rear of the coupler and another of which is adapted to be connected to the bottom of said sills, both of said webs acting to reinforce the stop face of said lowermost member.

6. In a railway draft rigging, the combination with spaced car sills, of a coupler, a horizontal yoke, means slidably connecting said yoke and coupler, a cushioning mechanism, rear stop means contacting said yoke, and upper and lower front stop members, said front stop members being provided with transversely disposed and vertically alined stop faces contacting the forward end of said cushioning mechanism, the lowermost of said stop members having a series of horizontally disposed webs or flanges one of said webs being adapted to receive a plurality of rivets for firmly connecting the member to said sills and another of said webs acting to reinforce the stop face thereof.

7. In a railway draft rigging, the combination with spaced draft sills, of a striking casting riveted to said draft sills, a coupler, a horizontal yoke, means slidably connecting said coupler and yoke, a cushioning mechanism, rear stop means contacting said yoke, upper and lower front stop members provided with transversely disposed and vertically alined stop faces contacting the forward end of said cushioning mechanism, the uppermost of said front stop members being connected to said striking casting and draft sills, and the lowermost of said front stop members being connected to the draft sills and having a portion adapted to support the coupler.

8. In a railway draft rigging, the combination with car sills, of a coupler, a yoke, means slidably connecting said coupler and yoke, a cushioning mechanism, rear stop means, relatively long flanged front stop members having vertically alined stop faces contacting the forward end of the cushioning mechanism, the upper most of said front stop members bridging the sills and having portions connected to the inner faces thereof, and the lowermost of said front stop members bridging said sills and having its main web portion in alinement with the bottom portions of said sills, said web portion being provided with a T-end, and a reinforcing web for said T-end adapted to support the coupler.

9. In a railway draft rigging, the combination with spaced car sills, of a striking casting connected thereto, a coupler, a yoke slidably connected to said coupler, cushioning mechanism, rear stop means, a plurality of front stop members connected to and adapted to bridge the draft sills above and below the coupler and yoke, and means passing through at least one of said front stop members and striking casting for connecting the same to the car sills and to each other.

10. In a railway draft rigging, the combination with spaced car sills, of a coupler, a yoke member slidably connected to said coupler, a cushioning mechanism, rear stop means, front stop members including an upper flanged casting connected to said sills and adapted to bridge the same, and a lower flanged casting connected to and bridging said sills, said lower flanged casting being provided with a horizontally disposed main web adapted to be connected to the car sills and another horizontal web vertically spaced from the main web, said second named web providing a support for the coupler.

11. A front stop member for railway draft rigging, adapted to bridge the draft sills and be disposed entirely above an associated coupler, provided with an upright stop face and having means to connect it to the draft sills both forwardly and rearwardly of the stop face.

12. A front stop member for railway draft rigging, having an upright stop face, adapted to bridge the draft sills and provided with a plurality of horizontal webs, one of said webs being adapted to receive a plurality of rivets for connection to the draft sills, and another of said webs acting to reinforce the stop face of the member.

13. A front stop member for railway draft rigging, having a substantially vertical stop face, adapted to bridge the draft sills, having a main web portion in substantial alinement with the bottom of said sills, said web meeting the stop face to form a T-end and a reinforcing web extending from the stop face and adapted to support a coupler.

14. A front stop member for railway draft rigging, having a substantially vertical stop face adapted to bridge the draft sills, having a main substantially horizontal web portion adapted to be connected to the draft sills, and another substantially horizontal web spaced from the main web and adapted to support a coupler.

In testimony whereof I affix my signature.

BYERS W. KADEL.